Jan. 31, 1967    R. A. F. JACKSON    3,301,251
STORAGE BLOCK ADAPTED FOR STORAGE AND EXCHANGE OF HEAT
Filed Sept. 4, 1964    3 Sheets-Sheet 1
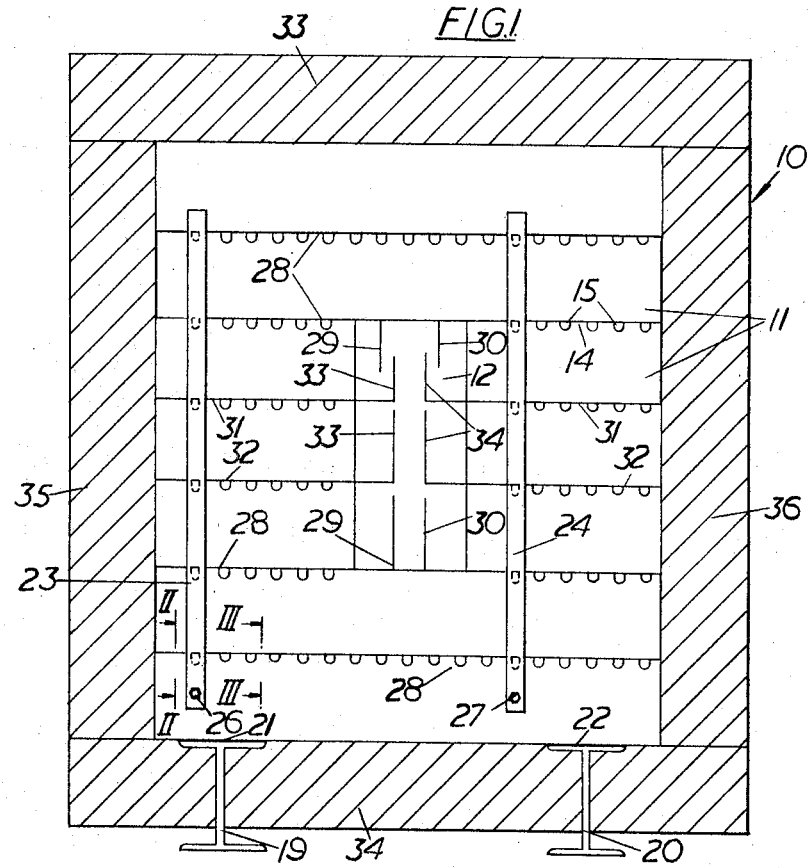
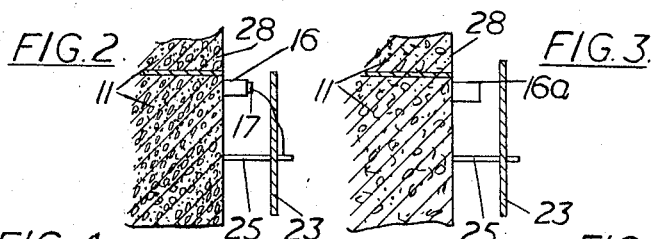
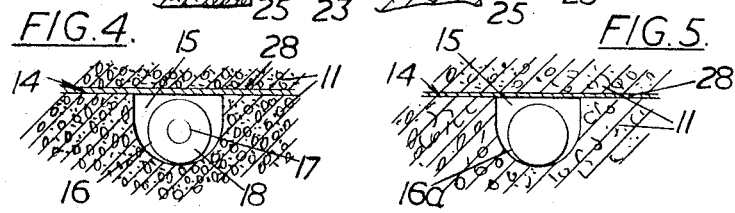
Inventor
Robert A. F. Jackson
By
Stevens, Davis, Miller & Mosher
Attorneys

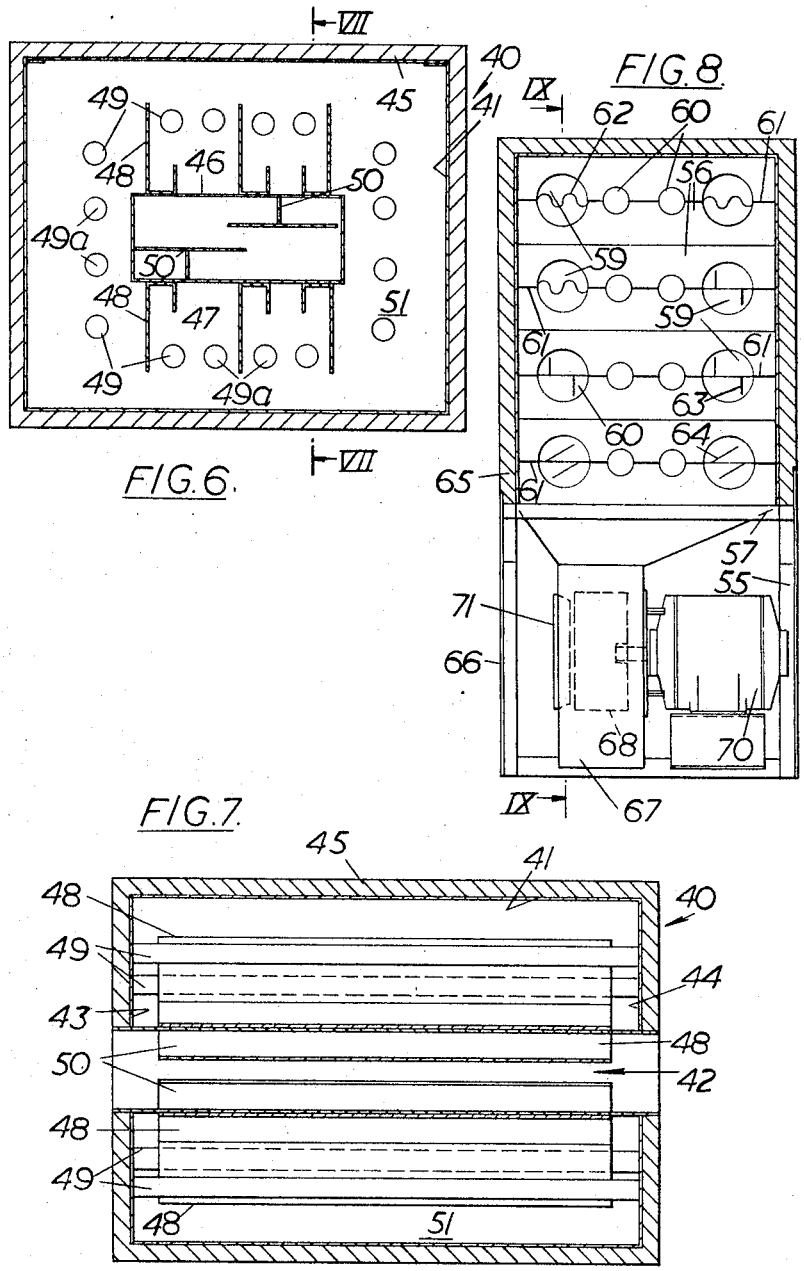

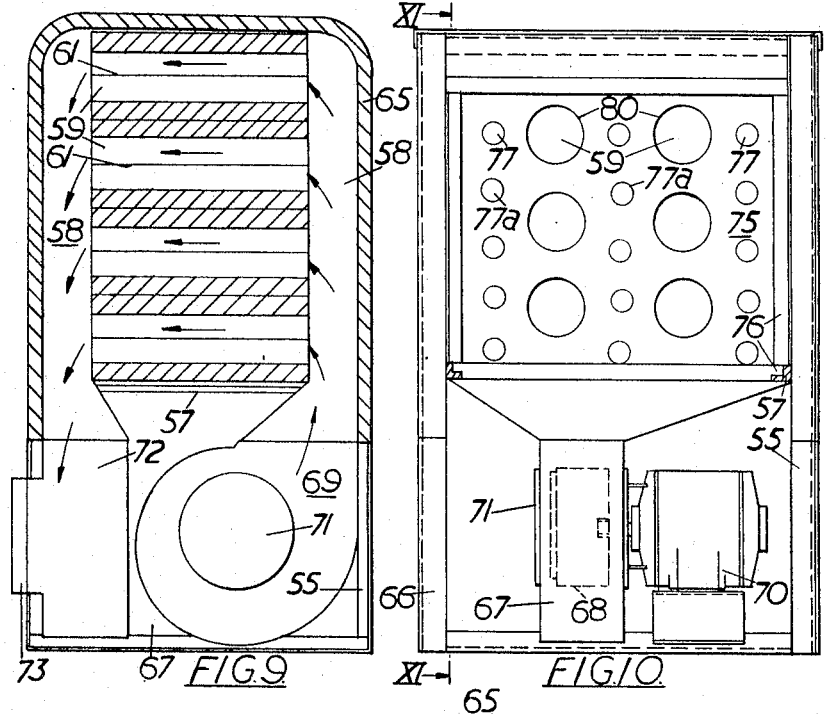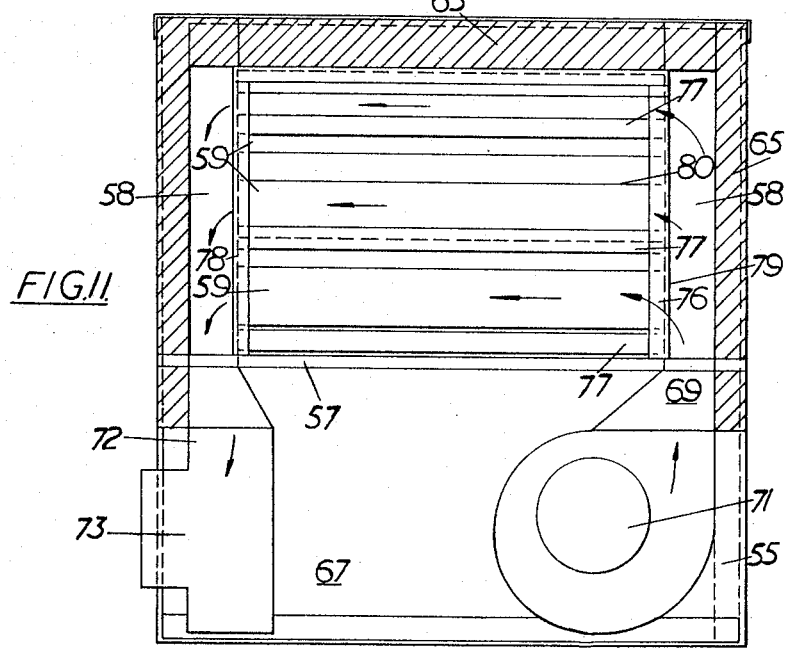

United States Patent Office 3,301,251
Patented Jan. 31, 1967

3,301,251
STORAGE BLOCK ADAPTED FOR STORAGE AND EXCHANGE OF HEAT
Robert Alfred Frederick Jackson, Glasgow, Scotland, assignor to Heatovent Electric Limited, Glasgow, Scotland
Filed Sept. 4, 1964, Ser. No. 394,588
7 Claims. (Cl. 126—400)

This invention relates to storage blocks of large thermal capacity suitable for transference of heat to raise, or to lower, the atmospheric temperature in offices, warehouses, houses and other buildings. The storage blocks of the invention may be constructed for heating by hot water, steam, gas or electricity, or for cooling by refrigeration means.

Large thermal capacity storage blocks, as heretofore proposed have been constructed of concrete or cement, for example, with possibly a mineral filler and have had low heat conductivity giving rise to uneven heat transfer to say, air passed through apertures in the block and conveyed to the building zones to which heat had to be transferred.

An object of the present invention is to obviate or mitigate this disadvantage.

The present invention is a storage block adapted for the storage and exchange of heat, comprising a mineral mass of low thermal conductivity, heat-insulating material surrounding said mass, heat conductive means penetrating said mass for effecting transference of heat energy between this means and said mass, and heat-exchange means extending from the interior of said mass to at least one duct extending wholly through the block for passage of air therethrough.

The mineral mass may comprise a plurality of superposed concrete slabs and said heat conductive means and heat-exchange means be in the form of metal sheets or plates of high heat conductivity sandwiched between contiguous surfaces of said slabs. Tubes for heating or cooling mediums are preferably located in channels provided therefor between adjacent slabs and fashioned in one or both of said contiguous surfaces.

The high conductivity sheets preferably extend into the duct or ducts. Moreover, in order to increase the surface area of those parts of said sheets which are located in the duct or any of the ducts, said parts may be corrugated or dimpled or otherwise formed with protuberances.

The mineral mass may, alternatively, be sand or other pulverulent mineral material contained in a metal housing between opposed walls of which extend one or more duct-defining tubes and a plurality of heating tubes for heating or cooling medium.

It will be understood that by reason of the pressure on the high conductivity sheets due to the weight of the mineral mass, a sufficiently rapid heat transfer from the mineral mass to the sheets and thence to the duct or ducts in the block takes place, each sheet presenting to the mineral mass two heat-transfer surfaces.

As a further alternative, the mineral mass may be an inorganic salt, or a mixture of inorganic salts, having a high latent heat of fusion and housed in a suitable impermeable casing. Glauber's salt is an inorganic salt suitable for the purposes of the invention.

Embodiments of the invention will now be described, by way of example, with reference to the accompanying drawings, in which:

FIG. 1 is a front elevation of a storage block according to the invention, insulation normally over the front face of the block being removed to show details otherwise hidden from view;

FIG. 2 is a section along the line II—II of FIG. 1 showing a detail of construction;

FIG. 3 is a section along the line III—III of FIG. 1 showing a further detail of construction;

FIG. 4 is a local section showing the manner in which heating elements are mounted in the block;

FIG. 5 is a local section showing how the cooling tubes are mounted in the block;

FIG. 6 is an end elevation of a further storage block according to the invention, the adjacent end wall and that part of an insulated cover normally concealing said end wall being removed to expose the internal construction of the block;

FIG. 7 is a side sectional elevation of the storage block of FIG. 6, along the line VII—VII of FIG. 6, and block, as in FIG. 6, being shown without the filling of sand or other mineral material of low thermal conductivity forming the thermal storage means of the block;

FIG. 8 is an end elevation of another storage block according to the invention, part of an insulated cover normally concealing the internal construction of the block from the adjacent end being removed to expose said internal construction;

FIG. 9 is a side sectional elevation along the line IX—IX of FIG. 8;

FIG. 10 is an end elevation of yet another storage block according to the invention, part of an insulated cover normally covering the adjacent end of the block being removed; and FIG. 11 is a side sectional elevation on the line XI—XI of FIG. 10.

Referring firstly to FIGS. 1 to 5 of the drawings, the storage block 10 therein shown comprises a bank of seven concrete slabs 11 of uniform rectangular section superimposed on one another, the bank being supported on a pair of parallel H-beams 19 and 20. Insulation pads 21 and 22 are sandwiched between the upper horizontal surfaces of the beams 19 and 20 and the underneath surface of the bottom slab 11. The three slabs 11 in the middle of the bank have centre portions removed in order to form a duct 12 which is continuous from front to rear of the stack. Each slab 11, save the uppermost one, is formed in its upper surface 14 with a series of parallel U-grooves 15, extending from front to rear of the slabs, and tubes 16 and 16a are disposed alternately in these grooves to project slightly fore and aft of the slabs (FIGS. 2 and 3). The tubes 16 house spirally-wound electrical heating elements 17 maintained out of contact with the tubes by insulating rings 18 located in the tubes. The tubes 16a serve for the flow through the block of a refrigerating medium from refrigerating means (not illustrated).

A pair of busbars 23 and 24 are mounted to the front of the bank of slabs 11 and are supported in spaced relationship from the front of the bank, for example, by ties 25 (FIG. 2), spaced along the length of the busbar. Alternatively, the busbars could be mounted on the support beams 19 and 20, with, of course, the interpositioning of the insulation pads 21 and 22, and held in spaced relationship from the bank of slabs 11 adjacent their upper ends only by ties 25.

The busbars 23 and 24 have terminals 26 and 27, respectively, for supply of current to the elements 17 which latter are connected in series.

The heat conductive means and heat exchange means are usually sheets of material of high thermal conductivity, for example copper, steel or aluminum and are disposed between adjacent slabs 11 to extend into the duct 12. As can be seen from FIG. 1, a sheet 28 of material of high thermal conductivity is interposed between the adjacent surfaces of the first and second slabs 11 at both the top and the bottom of the bank of slabs, the sheet 28 wrapping said second slab at the ends thereof and extending between the adjacent surfaces of the second and third slabs 11 at the top and bottom of the bank of slabs from whence each end of the sheet 28 accedes to the duct 12 and is there bent at a right angle into the duct to form fins 29 and 30. At each side of the duct 12, sheets 31 and 32 of material of high thermal conductivity are interposed, respectively, between the adjacent surfaces of the central slab 11 and the slabs immediately thereabove and therebelow, the ends of said sheets 31 and 32 where extending into said duct 12 being bent up right angles and forming fins 33 and 34, respectively. It will be manifest that the sheets 31 and 32 at each side of the duct could be made unitary and wrap the ends of the central slab.

The bank of slabs is totally enclosed, save at each end of the duct 12, by material of high thermal insulation value, such, for example, as fiberglass. In FIG. 1, this material is shown applied in the form of sheets 33, 34, 35 and 36, at the top, bottom and sides of the bank of slabs, and the front and rear of the bank of slabs have applied thereto similar sheets having centrally located rectangular openings which register with the duct 12, the front sheets being appropriately recessed to accommodate the busbars 23 and 24 and the projecting ends of the tubes 16 and 16a, and the rear sheets being appropriately recessed also to accommodate the projecting ends of the tubes 16 and 16a. It will be manifest that the storage block shown in and described with reference particularly to FIGS. 1, 2 and 4 could be in various dimensions to suit particular requirements, for example, it could have a B.t.u. capacity equal to 12,000 kw. hours in which event it would have a weight in the order of 100 tons. Moreover, the storage block could be modified in many ways, for example, there could be more than one duct 12.

The storage block, when in use for heating purposes, would normally be electrically heated during off-peak periods, its stored heat being transferred, when required, to air passed through the duct 12. The storage block, when in use for cooling purposes, would have refrigerating medium admitted to the tubes 16a when required to cool air passing through the duct 12. Pressure of the slabs 11 on the sheets 28, 31 and 32 of high thermal conductivity material ensures a sufficiently rapid transfer of heat or cold from the slabs to the sheets, and the fins 29, 30, 33 and 34 provide large surface areas in contact with air passed through the duct 12, thus effectively to heat or to cool said air.

Referring now to FIGS. 6 and 7 of the drawings, the storage block 40 comprises a box-shaped metal casing 41 through which extends a centrally-disposed and continuous metal duct 42 of regular rectangular section. The walls defining the duct 42 penetrate and are supported by the end walls 43 and 44 of the casing 41 (see FIG. 7). The casing 41 is entirely surrounded by a cover 45 of thermal insulation material, save only where the walls 43 and 44 are penetrated by the walls of the duct 42. A series of regularly-interspaced tubes 49 housing electrical heating elements (not shown) and 49a for passage of refrigerating medium extend between the end walls 43 and 44, the heating elements being series-connected and the end walls of the cover being appropriately recessed (not shown) to accommodate electrical fittings and connections (not shown).

Mounted on the upper and lower walls 46 and 47 defining the duct 42 are U-shaped metal fins 48 which extend into the space between the duct and the casing 41. One limb of each of the fins is shortened in view of the disposition of the tubes 49 as it is desirable that the fins should be spaced from the tubes. T-shaped fins 50 are mounted on the inside surfaces of the walls 46 and 47 to extend into the duct, but these may be omitted.

The space 51 between the duct 42 and the casing 41 is filled with sand or other pulverulent mineral material of low thermal conductivity. The filling would normally be effected in situ and the filling material should be both dry and clean. The use of the storage block of FIGS. 6 and 7 is similar to that already described with reference to FIGS. 1 to 5. The fins 48 ensure a sufficiently rapid transfer of heat or cold from the mineral filling to the duct-defining walls and thus to the fins 50, if provided, and to air passed through the duct 42.

Referring now to FIGS. 8 and 9 of the drawings, the storage block comprises a skeleton framework 55 of angle iron construction. A stack of four concrete slabs 56 is supported in the upper part of the framework by horizontal angle iron frame members 57 located at a level about one-third of the height of the framework 55 from the bottom of the latter. The stack of slabs fills the volume defined by the framework above the members 57 from front to rear of the block but is spaced from both ends of the block to provide air channels or ducts 58 (FIG. 9). Each slab is in two superposed horizontal sections and the contiguous faces of the two sections have formed therein co-operating recesses forming ducts 59 which are continuous from end to end of the slabs and communicate with the channels or ducts 58. The contiguous faces of the two sections of each slab have formed therein also co-operating recesses together forming continuous openings 60 for accommodating tubes (not shown) certain of which serve for passage of refrigerating medium and certain of which house spirally wound electrical heating elements maintained out of contact with the associated tubes by insulating rings located in the tubes as hereinbefore described. Sandwiched between the contiguous faces of the two sections of each slab, to each side of the opening 60, are sheets 61 of material of high heat conductivity, for example copper, steel or aluminum. The sheets extend through the ducts 59 and, where so doing, may be corrugated as shown at 62 or provided with vertical fins 63 or oblique fins 64, as shown at different parts of FIG. 8, all with the object of increasing the surface area of the sheet material in the ducts. The block is provided with a surround 65 of material of high thermal insulation value which is discontinued at the lower part of the block below the frame members 57 and there replaced by a sheet metal casing 66 which overlaps same as shown in FIG. 8.

Within the casing 66 is a shaped member 67 which provides passage 72 in continuation of the duct or channel 58 at one end of the block and isolates the same from the duct or channel 58 at the other end of the block. The member 67 houses an impeller 68 communicating by way of a passage 69 with the duct or channel 58. The impeller 68 is shown in dotted lines in FIG. 8 only and is energised by an electric motor 70. The member 67 has an inlet 71 for air to the impeller and the passage 72 communicates with an outlet 73 to the exterior of the block. The air inlet 71 also communicates with the exterior of the block.

The storage block of FIGS. 8 and 9 would, where required for heating purposes, normally be electrically heated during off-peak periods. Where the block is required for cooling purposes, refrigerating medium is supplied to the appropriate pipes. The stored heat or cold is transferred, when required, to air thrust by the impeller through the passage 69 and, the duct 58 communicating therewith, such air traversing the ducts 59 and collecting heat or cold from the sheets 61, before reaching the other duct 58 and flowing through the air outlet 73 from the passage 72. The air circulation is indicated by the arrows in FIG. 9.

Referring now to FIGS. 10 and 11 of the drawings, the storage block therein shown is similar to that just described with reference to FIGS. 8 and 9, differing from the latter mainly in that the mineral mass of low thermal conductivity is sand, and, as sand is free flowing, it must be contained. Parts in FIGS. 10 and 11 which correspond to parts already identified in FIGS. 8 and 9 are denoted by the same reference numerals and further description thereof would be superfluous. In FIGS. 10 and 11 the mild steel angle frame 55 supports by way of the frame members 57 a box-shaped metal casing 75 reinforced at its edges by angle members 76. Tubes 77a for passage of refrigerating medium and tubes 77, housing spirally wound electric heating elements (not shown) maintained out of contact with the tubes by insulating rings located in the tubes as hereinbefore described, extend between the end walls 78 and 79 of the casing 75, being fitted flush with openings in said end walls. As already described the heating elements are series-connected and the appropriate electrical fittings and connections would be provided. The ducts 59 for communicating through the mineral mass between the ducts 58 are provided by horizontal tubes 80 connecting between the end walls 78 and 79 of the casing 75 and fitted flush with openings in said end walls. The casing 75 is filled with sand (not shown) or other pulverulent material of low thermal conductivity. The filling would normally be effected in situ and the filling material should be both dry and clean.

The storage block of FIGS. 10 and 11 would be used in a manner similar to that already described with reference to FIGS. 8 and 9.

All joints in the framework and casing of the two embodiments just described with reference to FIGS. 8 and 9, and FIGS. 10 and 11, would normally be welded, and the impeller and motor would be bolted in position.

In a further modification, the mineral mass is a mixture of inorganic salts of high latent heat of fusion and is contained in a box-shaped and impermeable casing. It will be manifest that the mineral mass will absorb a substantial amount of heat energy when changing state from solid to liquid, this taking place at a temperature of about 154° F. Thus this substantial amount of heat energy is stored until the temperature drops below 154° F. and the stored heat is then given off to the circulating air.

I claim:

1. A storage device adapted for the storage and exchange of heat, comprising a plurality of storage blocks each having a mineral mass of low thermal conductivity, heat-insulating material surrounding said blocks, said blocks having at least one duct extending wholly through said blocks for passage of air therethrough, heat-conductive means between said blocks for effecting transference of heat energy between said blocks and said duct, said heat-conductive means being movable in relation to said blocks to vary the heat transfer therefrom, and heat-exchange means extending from said heat-conductive means into said at least one duct and oriented to cause air flowing through said duct to sweep the major faces of said heat-exchange means extending into said duct.

2. A storage device as set forth in claim 1, in which said mineral mass comprises a plurality of superposed slabs of concrete having pairs of adjacent surfaces, and said heat-conductive means is a plurality of metal plates of high thermal conductivity sandwiched individually between said pairs of adjacent surfaces terminating in said heat-exchange means shaped as fins projecting into said at least one duct.

3. A storage block as set forth in claim 2, in which at least one of each said pair of adjacent surfaces is channeled to provide channels between each said pair, and heating tubes and cooling tubes are located individually in said channels.

4. A storage device adapted for the storage and exchange of heat, comprising a plurality of superposed slabs of concrete having pairs of adjacent surfaces, heat-insulating material surrounding said slabs, heat-conductive means penetrating said slabs for effecting transference of heat energy between said heat-conductive means and said slabs, said device having at least one duct extending wholly through said device for passage of air therethrough, and metal plates of high thermal conductivity sandwiched individually between said pairs of adjacent surfaces, said metal plates being movable in relation to said adjacent surfaces, said metal plates terminating in fins extending into said at least one duct to serve as baffles at right angles to flow of air through said duct, whereby to provide sinusoidal flow of air and efficient heat-exchange between said fins and the air.

5. A storage block as set forth in claim 4, in which the fins which are loacted in said at least one duct are profiled to provide a large surface area relative to the duct cross-section.

6. A storage device adapted for the storage and exchange of heat, comprising a plurality of superposed slabs of concrete having pairs of adjacent surfaces, heat-insulating material surrounding said slabs, heat-conductive means penetrating said slabs for effecting transference of heat energy between said heat-conductive means and said slabs, said device having at least one primary duct extending wholly through said device for passage of air therethrough, metal plates of high thermal conductivity sandwiched individually between said pairs of adjacent surfaces and terminating in fins extending into said first duct to serve as baffles at right angles to flow of air through said duct, whereby to provide sinusoidal flow of air and efficient heat exchange between said fins and air passing therethrough, said device also having mutually isolated secondary ducts, said primary duct intercommunicating between at least two secondary ducts, and means for impelling air into one of said ducts thus to provide a continuous and forced unidirectional flow of air to be treated in the block into and along said one said secondary duct through said at least one primary duct and along the other said secondary duct.

7. A storage device as set forth in claim 6, in which the fins are profiled to provide a large surface area relative to the duct cross-section.

References Cited by the Examiner

UNITED STATES PATENTS

| | | | |
|---|---|---|---|
| 2,022,812 | 12/1935 | Roe | 219—365 |
| 2,911,513 | 11/1959 | MacCracken | 219—378 X |
| 3,060,870 | 10/1962 | Hexdall | 126—400 X |

FOREIGN PATENTS 906,063   9/1962   Great Britain.

MEYER PERLIN, *Primary Examiner.*

ROBERT A. O'LEARY, *Examiner.*

A. DAVIS, *Assistant Examiner.*